Figure 1:
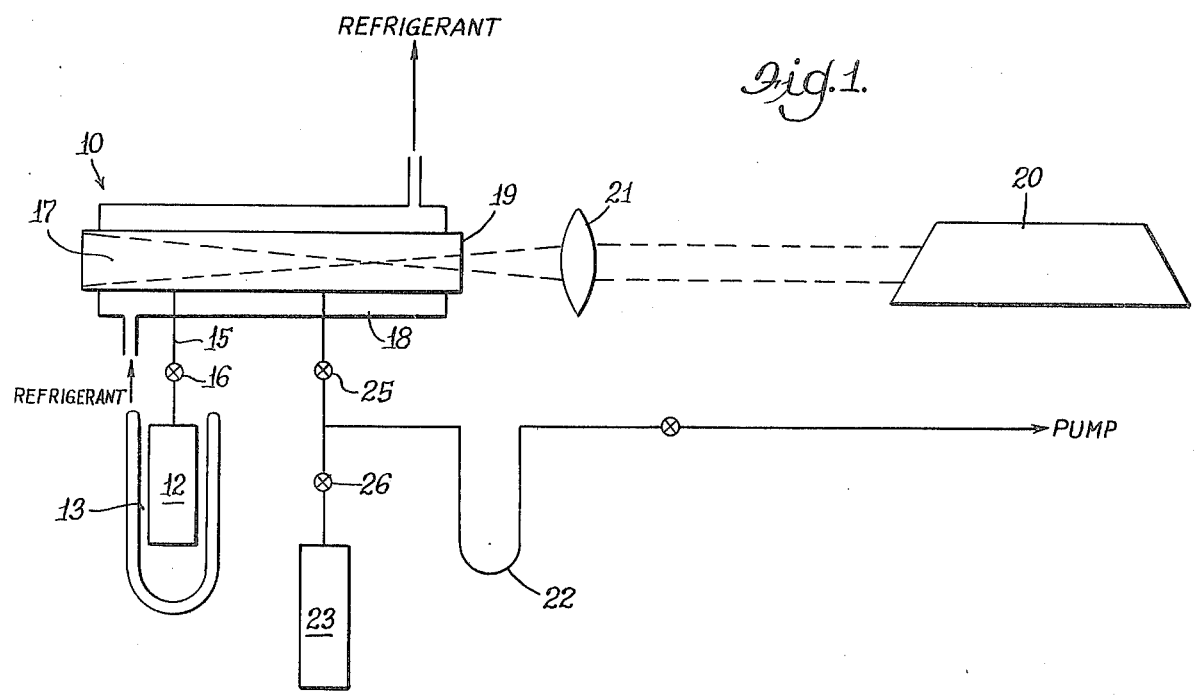

United States Patent [19]

Porter, II

[11] 4,230,547

[45] Oct. 28, 1980

[54] METHOD FOR SEPARATING KRYPTON ISOTOPES

[75] Inventor: John T. Porter, II, Del Mar, Calif.

[73] Assignee: General Atomic Company, San Diego, Calif.

[21] Appl. No.: 848,248

[22] Filed: Nov. 3, 1977

[51] Int. Cl.² .............................................. B01J 1/10
[52] U.S. Cl. ..................... 204/157.1 R; 204/DIG. 11
[58] Field of Search ................. 204/157.1 R, DIG. 11

[56] References Cited

U.S. PATENT DOCUMENTS

| | | | |
|---|---|---|---|
| 4,003,809 | 1/1977 | Lyon | 204/157.1 R |
| 4,032,419 | 6/1977 | Bernstein | 204/157.1 R |
| 4,082,633 | 4/1978 | Eerkens | 204/157.1 R |

OTHER PUBLICATIONS

Hecht, Analog Science Fiction/Science Fact, vol. XCVI, No. 9, (Sep. 1976), pp. 54 & 59.
Schreiner et al., J.A.C.S., vol. 87 (1965), pp. 25-28.
Claassen et al., J. Chem. Phys., vol. 42 (1965), pp. 1229 et seq.

Primary Examiner—Howard S. Williams
Attorney, Agent, or Firm—Fitch, Even & Tabin

[57] ABSTRACT

Methods and apparatus for separating krypton isotopes utilizing low temperature selective infrared excitation of $^{85}$krypton difluoride in an isotopic compound mixture. Multiphoton IR excitation and UV excitation techniques are used, as well as cryogenic matrix isolation and inert buffer gas isolation techniques.

10 Claims, 2 Drawing Figures

U.S. Patent

Oct. 28, 1980

4,230,547

METHOD FOR SEPARATING KRYPTON ISOTOPES

The present invention is directed to separation of krypton 85 from a mixture of krypton isotopes, and more particularly, is directed to methods and apparatus utilizing laser radiation for such isotopic separation.

The radioactive isotope krypton 85, which is available as a fission product from nuclear power plants, is useful as a heat source for thermoelectric batteries. However, this utility is reduced by the fact that the krypton recovered from the processed fuel from a power plant contains only about 8 percent of the krypton 85 species. The remainder is a mixture of other krypton isotopes specifically including $^{83}$Kr, $^{84}$Kr, and $^{86}$Kr, which do not substantially contribute to heat source utility. Methods for enriching krypton 85, such as thermal diffusion, are known but are difficult to apply to a mixture of four isotopes as heavy as krypton, particularly in mixtures where the isotopes one unit heavier and one unit lighter than the desired isotope are present.

The utility of krypton 85 as a heat source would be increased if the krypton 85 could be separated from the stable krypton isotopes which accompany it.

Techniques such as multiphoton infrared photochemical techniques have been demonstrated or proposed for isotopic separation of a number of elements including boron, sulfur, carbon, silicon, chlorine, hydrogen, osmium, uranium and molybdenum [A. L. Robinson, 194, Science, pp. 45-48 (October, 1976); Lyman, et al., 47, Journal of Applied Physics, pp. 595-601 (1976); U.S. Pat. Nos. 3,937,956, 3,951,768, 3,996,120, 4,000,051, and 4,003,809; bracketed references are incorporated by reference herein]. Although fully descriptive understanding of this class of processes has not been developed, in general phenomenological terms, they may be described as processes in which a molecule containing the objective isotope is irradiated in an intense field of an infrared laser tuned to be absorbed by the desired isotope. The laser intensity must be high enough and the gas pressure low enough that the required multiple absorption of photons occurs at a rate comparable to or greater than vibrational relaxation.

However, despite the advances in laser photochemical separation technology, improved laser methods and apparatus for separating krypton 85 from an isotopic mixture have not been provided.

Figure 2:
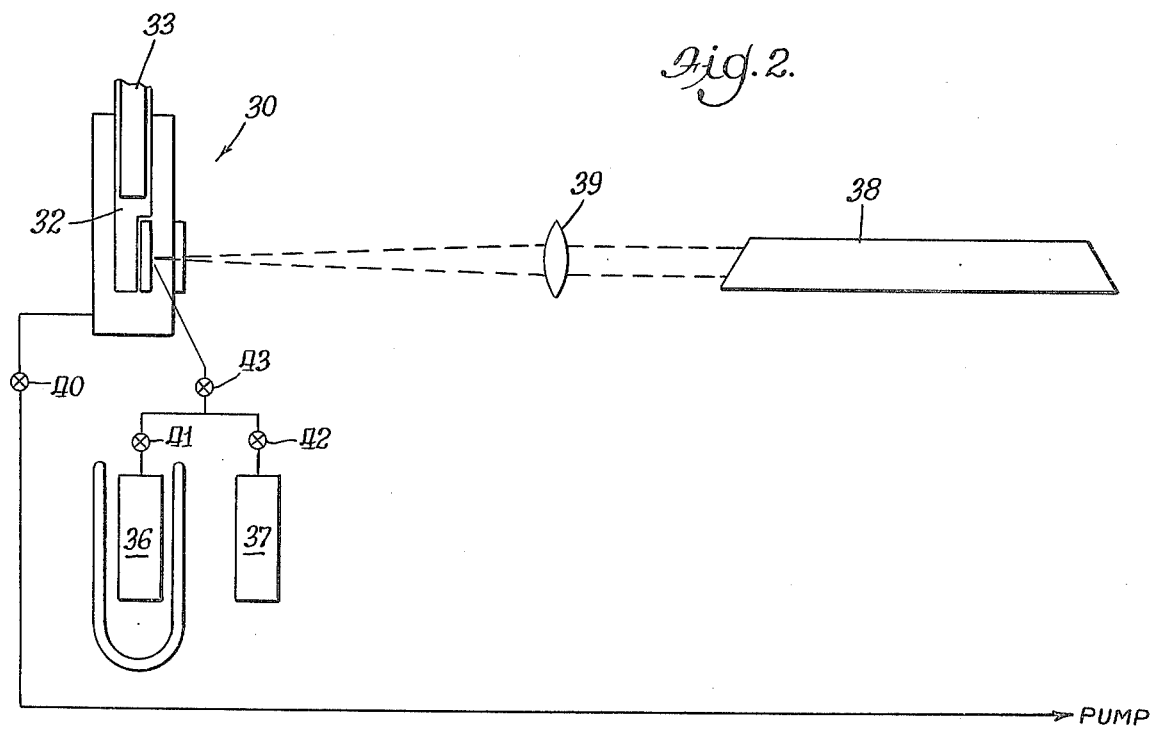

Accordingly, it is an object of the present invention to provide an improved method for separating the isotopes of krypton and in particular for enriching a mixture in krypton 85. These and other objects will be apparent from the following detailed description and the accompanying drawings of which:

FIG. 1 is an illustration of laser apparatus particularly adapted to carry out enrichment of krypton 85; and FIG. 2 is an illustration of another embodiment of laser apparatus adapted to carry out enrichment of krypton 85.

Generally in accordance with the present invention, a mixture of krypton isotopes containing an amount of krypton 85 isotope to be separated is reacted with fluorine to provide the isotopic mixture in the form of its krypton difluoride compound ($KrF_2$).

In this regard, while krypton is in general chemically inert, it is capable of forming the thermodynamically unstable compound $KrF_2$ under the appropriate conditions. Further, in this connection, $KrF_2$ may be prepared by electric discharge through the gaseous elements krypton and fluorine at low temperature [Schreiner, F., J. G. Malm and J. C. Windman, J. Amer. Chem. Soc., 87, 25 (1965)]. Although krypton difluoride is thermodynamically unstable and undergoes gradual decomposition at normal temperatures, it may be stored for extended periods at dry ice temperatures.

Further in accordance with the present invention, the separation of krypton isotopes is accomplished by selectively decomposing the desired isotopic species of $KrF_2$ by employing selective vibrational excitation through selective multiphoton absorption in the desired $^{85}KrF_2$ species.

The infrared and Raman spectra of krypton difluoride have been measured [H. H. Classen, et al., J. Chem. Phys., 42, 1229 (1965)]. The results are in accord with $KrF_2$ being a linear, symmetric molecule with the krypton atom occupying the center position.

For the linear krypton difluoride symmetric molecule, the asymmetric stretching frequency provides a krypton isotope effect. From the observed frequency for natural abundance $KrF_2$, the asymmetric stretching frequencies for the various isotopic species of krypton difluoride may be estimated as follows:

| | |
|---|---|
| $^{83}KrF_2$ | 588.9 cm$^{-1}$ |
| $^{84}KrF_2$ | 587.8 |
| $^{85}KrF_2$ | 586.7 |
| $^{86}KrF_2$ | 585.6 |

In addition to the asymmetric stretching modes of the krypton difluoride molecule, there are other vibrational modes which provide an isotopic variation of frequency particularly including combination symmetric and asymmetric modes having an absorption band at about 1032 cm$^{-1}$. In accordance with the present invention, the isotope mixture which is provided in the form of the krypton difluoride compound, is selectively irradiated with infrared radiation which is isotopically selective to the desired krypton difluoride isotopic species. This irradiation should be carried out at low temperatures, as will be discussed in more detail hereinafter.

To achieve selective vibrational excitation, it is necessary that the vibration excited involve motion of the isotopic atom, that is krypton. For this purpose, the $\nu_2$ band at 233 cm$^{-1}$, the $\nu_3$ band at 558 cm$^{-1}$, or the $\nu_1+\nu_3$ combinination band at 1032 cm$^{-1}$ are suitable but the combination band is particularly favorable because it is accessible to the carbon dioxide laser and because the energy per quantum is large.

The asymmetric fundamental frequency of $KrF_2$ at about 587 cm$^{-1}$ corresponds to an infrared wavelength in the range of about 17 microns. While laser systems such as semiconductor diodes having output in this frequency range are available, high power lasers operating in this range have not yet been developed. Accordingly, while high power lasers may become available from development work to provide a high powered laser source radiating at 15.9 microns for applications to $UF_6$ enrichment, present applications of the invention most desirably utilize absorption in the symmetric-asymmetric mode at about 1032 cm$^{-1}$ for which a high power carbon dioxide laser may be used as a selective irradiation source. This absorption band of $KrF_2$ lies within the P-branch of the 00°1-02°0 transition of $CO_2$ for which lasing is possible.

As indicated, the isotopically selective irradiation is carried out at reduced temperatures. In this connection, $KrF_2$ is known to be unstable, in fact decomposing at a rate of about 10% per hour at room temperature. This, of course, means that the free energy of a mixture of the elements is lower than that of the compound.

Accordingly, the selective irradiation of the $KrF_2$ isotopic mixture should be carried out at reduced effective temperatures of less than about 0° C., and preferably in the range of from about $-50°$ C. to about $-10°$ C., so that the separative effect is not obscured by spontaneous decomposition of the $KrF_2$ isotope mixture.

Furthermore, a nozzle expansion coupling such as that utilized for high resolution studies of $SF_6$ and $UF_6$ may also be utilized to provide an effectively low temperature [Jensen, R. J., et al., *Laser Focus*, May, 1976, p. 51]. However, an isolation matrix technique in which the mixture is super-cooled with an excess of an inert material such as argon is particularly preferred. In any event, the isotopic splitting is large compared with laser tuning capabilities.

In order to separate the krypton 85 isotope, the $KrF_2$ compound mixture is subjected to infrared radiation selective to the $^{85}KrF_2$ species, which through multiphoton absorption may acquire sufficient energy to selectively decompose at the reduced temperature into the desired krypton 85 species and fluorine. The resultant krypton 85 and fluorine may be readily separated by conventional techniques, such as by chemically reacting the fluorine to remove it from the mixture.

Turning now to the drawings, various of the features of the invention will now be more particularly described with respect to the apparatus 10 illustrated in FIG. 1.

In apparatus 10, a quantity of $KrF_2$ prepared from the mixture of krypton isotopes to be separated, is provided in a sealed reservoir 12, which is maintained at dry ice temperature ($-78°$ C.) by surrounding bath 13 comprising a suitable vessel containing a slurry of frozen $CO_2$ in acetone to prevent the spontaneous decomposition of the $KrF_2$ compound source material.

The $KrF_2$ reservoir 12 is in communication via conduit 15 and valve 16 with a reaction cell 17. The reaction cell 17 is provided with a refrigerant jacket 18 so that the interior reaction zone of the cell may be maintained at a predetermined temperature under operation control. The reaction cell is also provided with a laser input zone 19 which is substantially transparent to the isotopically selective laser radiation used in the method. The illustrated reaction cell 17 may have an internal volume of about 50 $cm^3$, and the "window" zone 19 may be made of magnesium fluoride.

Selectively tuned laser radiation may be directed in the cell 17 from carbon dioxide laser 20 operating in pulsed mode directed to lens element 21 for focusing of the laser beam within the reaction cell cavity. The apparatus also includes a trap 22, and buffer gas supply 23 the use of which will be more fully explained hereinafter.

To carry out the separation method, reaction cell 17 is first evacuated by opening the appropriate valves 24, 25 to a vacuum pump (not shown) while $KrF_2$ and buffer gas source valves 16, 26 are closed. The reaction cell 17 is then isolated by closing valve 25, the value to the $KrF_2$ reservoir 12 is opened, and the dry ice bath 13 is replaced with a bath having a temperature of about $-43°$ C. This fills the reaction cell 17 with $KrF_2$ to a pressure of about 1 torr. Further, to protect the $KrF_2$ in the cell from undesired spontaneous decomposition, the cell is equipped with a jacket 18 through which a refrigerant at $-30°$ C. is circulated. After the $KrF_2$ has been admitted to the cell, the cell is isolated from the $KrF_2$ reservoir 12 by closing valve 16 and a buffer gas which can conveniently be inert argon or helium, is added from reservoir 23 to provide a total pressure of about 10 torr. Generally, the molar ratio of inert buffer gas to $KrF_2$ in the reaction cell 17 should be at least about 5, and preferably at least about 10. The inert buffer gas, of course, should not substantially absorb the isotopic selective radiation used in the method.

The mixture of $KrF_2$ and buffer gas in the isolated cell 17 is then subjected to pulses of selectively tuned radiation at a power of from about one to a few joules and of one hundred to a few hundred nanoseconds duration from laser 30. The laser is appropriately tuned so that energy is preferentially absorbed to excite the vibration of $^{85}KrF_2$ (or other krypton isotope selected). Further, the pulses are brought to a focus within the cell by lens 21 to achieve a high flux within a partial volume of the cell 17 to enhance multiphoton absorption.

It is clear from considering the spectra of $KrF_2$ [Classen, H. H., G. L. Goodman, J. G. Malm, and F. Schreiner, *J. Chem. Phys.*, 42, (1965); C. Murchison, S. Reichman, D. Anderson, J. Overend and F. Schreiner, *J. Am. Chem. Soc.*, 90, 5690 (1968)] that there will be an overlap in the rotational structures of the vibrational bands of the various isotopic species of $KrF_2$. For this reason, the laser 20 can best be tuned and adjusted by measuring the selectivity of the decomposition reaction, for example by mass spectral analysis of the krypton product. It may also be advantageous to employ a filter consisting of $KrF_2$ not containing the desired isotope. For this purpose, a cell similar to the reaction cell 17 but of sufficient length to filter the undesired wavelengths can be interposed between the laser 20 and the focusing lens 21 or, following the suggestion of Burak, et al., [*J. Appl. Phys.*, 39, 4464 (1968)], such a filter can be included within the optical cavity of the laser 20 to suppress lasing at wavelengths absorbed by the undesired isotopic species.

As a consequence of this treatment, the $^{85}KrF_2$ or other selected isotopic species is preferentially decomposed at the cryogenic temperature to krypton and fluorine. After an appropriate number of pulses, such as from about ten to ten thousand, the laser treatment is terminated. A dry ice bath is placed around trap 23 and by appropriate manipulation of the valves 24, 25, the gaseous mixture from the cell is withdrawn from the cell by action of the pump. The undecomposed $KrF_2$ is retained in trap 23. The mixture of decomposed krypton, fluorine and buffer gas is removed by the pump and separated by conventional techniques. For example, the fluorine can be removed by reaction with ice at low temperature and the selectively separated krypton removed from the buffer gas by cryogenic distillation.

It will also be understood that the particular apparatus and conditions described in the specific example are illustrative only, particularly as to intensities, times, temperatures and pressures. The general conditions that are to be met are that the intensity and pulse time be such that the desired isotopic species can be selectively decomposed without substantially heating the reaction mixture through vibrational relaxation. For this reason, the pressure must be low enough that the vibrational relaxation time is not short compared to the pulse time. Further, the buffer gas should be present in sufficient amount to reduce vibrational exchange between $KrF_2$ molecules which could result in scrambling of the isotopes in the product. Also, the buffer gas should provide for rotational relaxation, in order to allow more efficient excitation of the desired isotopic species and more effective use of the laser pulse.

In the gas phase, $KrF_2$ has quantized rotational energy states and even at the lowest temperature at which it has an appreciable vapor pressure the molecules will be distributed over a number of these states. Since the laser can selectively excite only those molecules in one particular rotational state, the rate at which the selective excitation can be carried out is limited by the rate of rotational relaxation, as has been discussed by Letokhov and Makarov [Soviet Physics JETP, 36, 1091 (1973)].

For this reason, a preferred embodiment of the present method of selective isotopic decomposition of $KrF_2$ utilizes a method of matrix isolation at cryogenic temperature. This method eliminates the rotational motion of the $KrF_2$. Matrix isolation techniques are well known in spectroscopy and have been used as visible, electronic laser excitation processes [Dellinger, et al., JACS 99, pp. 3197], but have not previously been used for infrared laser processes for isotope separation.

In matrix isolation, the $KrF_2$ source material and an inert gas are co-deposited on a cryogenic surface. The molar ratio of $KrF_2$ to the inert gas, which is preferably argon, will best be less than about 1:100, so that the molecules of $KrF_2$ is substantially isolated in a solidified inert gas matrix. As applied to the separation of krypton isotopes this technique can readily be understood by reference to the apparatus 30 of FIG. 2 of the drawings.

Apparatus 30 comprises a vacuum irradiation chamber 31, which comprises a support rod 32 having a cryogenic fluid cavity 33, and a calcium fluoride matrix support plate 34. Apparatus 30 further comprises a refrigerated $KrF_2$ source reservoir 36 and an argon reservoir 37, which may be introduced into the irradiation cavity by jet nozzle 35 toward support plate 34. In operation, the vacuum chamber 31 is first evacuated through the appropriate valve 40 to the pump (not shown). A low temperature refrigerant such as liquid hydrogen is then admitted to the cavity 33, thereby cooling the support rod 32, and the $CaF_2$ support plate 34. After appropriate temperature conditions have been established the valves 41, 42, 43 are adjusted to admit a mixture of $KrF_2$ from the reservoir 36, and argon from the reservoir 37, through the jet 35. The $KrF_2$ and argon, in for example, a 1:1000 ratio, form a frozen layer on the $CaF_2$ support plate 35.

After a sufficient layer of the mixture is deposited, the jet 35 is turned off. The $KrF_2$ is now fixed in a frozen matrix of argon. Under these conditions, the $KrF_2$ is rotation free.

The matrix-isolated $KrF_2$ is now irradiated by the laser 38, focused through the lens 39, in a manner similar to the gas phase process described with respect to the apparatus 10 of FIG. 1. Upon completion of the irradiation, the refrigeration is stopped, and the unreacted $KrF_2$ and decomposition products are removed via the pump as the support rod 32 warms. The separation of reactants and products can be carried out as in the gas phase process.

The specific embodiments of processes described with respect to the apparatus of FIGS. 1 and 2 are multiphoton absorption processes in which a sufficient number of photons are absorbed by molecules of the desired isotopic species to produce decomposition into elemental Kr and $F_2$ components. However, various aspects of the present invention are not limited to multiphoton absorption, and may include combined infrared/ultraviolet irradiation processes. Such combination processes could be used with either a suitably cooled gas phase or matrix isolated system.

Further in this connection, because of the intrinsic instability of $KrF_2$, this compound is particularly advantageous for the application of multiphoton infrared decompositions processes, but its use in the separation of krypton isotopes is not, however, limited to multiphoton absorption processes. Thus, selective two-step photodecomposition processes such as those described by Letokhov [Science, 180, 451 (1973)] may be used for separation of suitably cooled source material.

In the application of two-step processes, the $^{85}KrF_2$ molecules are selectively excited vibrationally by an intense pulse from an infrared laser tuned, for example, to the $\nu_1+\nu_3$ combination band, and the excited $^{85}KrF_2$ molecules are then subsequently decomposed by a pulse from an intense ultraviolet source which may conveniently be an appropriate second laser. The requirements of this ultraviolet source are that it have sufficient intensity to excite the vibrationally excited $^{85}KrF_2$ into a dissociative state in a time comparable to or shorter than the vibrational relaxation time, and that it be tuned to a wavelength more strongly absorbed by $^{85}KrF_2$ previously excited vibrationally than by $KrF_2$ molecules in the vibrational ground state. On the basis of the results of Makeev, et al., [Doklady Akademii Nauk SSR 222, 151-154 (1975)] the preferred wavelength is about 2500A.

Subsequent to decomposition, the separation of reactants and products can be carried out as in the multiphoton infrared process.

Accordingly, it will be appreciated that through the present invention, improved methods and apparatus for enrichment of krypton isotopes, particularly including krypton 85, have been included.

While the present invention has been particularly described with respect to specific embodiments, it will be further appreciated that various modifications and adaptations may be utilized without departing from the spirit and scope of the present disclosure, and such modifications and adaptations are intended to be within the scope of the present invention.

Various of the features of the invention are set forth in the following claims.

What is claimed is:

1. A method for separating krypton 85 from a mixture of a plurality of krypton isotopes including $^{83}Kr$, $^{84}Kr$, $^{85}Kr$, and $^{86}Kr$, comprising
reacting the mixture of krypton isotopes with fluorine to provide a thermodynamically unstable mixed isotope krypton difluoride source material which spontaneously decomposes on an isotopically nonselective basis,
maintaining said mixed isotope krypton difluoride source material at a low temperature of less than about 0° C. while selectively irradiating said mixed isotope krypton difluoride source material with infrared radiation at a wavelength at a frequency selected from the asymmetric stretching frequency of the $^{85}KrF_2$ molecule at 586.7 cm$^{-1}$, the $\nu_2$ vibrational frequency of the $^{85}KrF_2$ molecule at 233 cm$^{-1}$, the $\nu_3$ vibrational frequency of the $^{85}KrF_2$ molecule at 558 cm$^{-1}$ or the $\nu_1+\nu_3$ combination vibrational frequency of the $^{85}KrF_2$ molecule at 1032 cm$^{-1}$ which frequency is selectively absorbed by $^{85}$krypton difluoride and decomposing the selectively excited $^{85}$krypton difluoride compound to $^{85}$krypton and fluorine, and separating the decomposition product $^{85}$krypton from the fluorine and remaining undecomposed krypton difluoride source material.

2. A method in accordance with claim 1 wherein said infrared radiation is supplied by a carbon dioxide laser in the 1032 cm$^{-1}$ absorption band of krypton difluoride.

3. A method in accordance with claim 1 wherein said irradiation is carried out on gaseous mixed isotope krypton difluoride source material at a cryogenic temperature of from about $-50°$ to about $-10°$ C. in the presence of an inert buffer gas which does not substantially absorb at said irradiation frequency, said inert buffer gas being present in a molar ratio of said inert buffer gas to said gaseous krypton difluoride source material of at least about 5 which is sufficient to substantially reduce vibrational exchange between gaseous $KrF_2$ molecules capable of isotopic scrambling of the krypton decomposition product and wherein the $^{85}KrF_2$ isotopic component of said gaseous source material is selectively decomposed without substantially heating the gaseous mixture of said source material and inert buffer gas through vibrational relaxation.

4. A method in accordance with claim 3 wherein said inert buffer gas is argon and wherein the molar ratio of krypton difluoride source material to buffer gas is less than about 1:10.

5. A method in accordance with claim 1 wherein said mixed isotope krypton difluoride source material is selectively irradiated at cryogenic temperature in a solidified isolation matrix of inert gas to eliminate rotational motion of the source material molecules during said selective irradiation.

6. A method in accordance with claim 5 wherein the molar ratio of krypton difluoride source material to inert gas in said matrix is less than about 1:100.

7. A method in accordance with claim 6 wherein said inert gas is argon.

8. A method in accordance with claim 1 wherein said decomposition of said selectively excited $^{85}$krypton difluoride is carried out by irradiating said selectively excited $^{85}$krypton difluoride with ultraviolet radiation of sufficient energy to raise the selectively excited $^{85}$krypton difluoride to a dissociative state, but not of sufficient energy to excite krypton difluoride source material from the ground state to a dissociative state.

9. A method in accordance with claim 1 wherein said decomposition of said selectively excited $^{85}$krypton difluoride is carried out by multiphoton infrared absorption of infrared radiation selective to $^{85}$krypton difluoride.

10. A method in accordance with claim 1 wherein said separation of decomposition product $^{85}$krypton is carried out by cryogenic distillation.

* * * * *